United States Patent Office 3,095,440
Patented June 25, 1963

3,095,440
ESTERS OF PHOSPHONODITHIOIC ACID
Peter E. Newallis, Crestwood, and John P. Chupp, Kirkwood, Mo., assignors to Monsanto Chemical Company, St. Louis, Mo., a corporation of Delaware
No Drawing. Filed Mar. 8, 1962, Ser. No. 178,243
16 Claims. (Cl. 260—461)

This invention relates to a new and useful method of making esters of phosphonodithioic acid of the formula

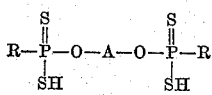

wherein R is a hydrocarbyl radical free of aliphatic unsaturation and containing 1 to 18 carbon atoms and wherein A is a divalent aliphatic hydrocarbon radical having a chain length of at least two carbon atoms connecting the respective oxygen atoms of the afore set forth structural formula, and to the novel esters obtained thereby.

In accordance with this invention it has been found that the abovedescribed esters of phosphonodithioic acid can be obtained in a convenient and efficient manner by reacting at least one dihydric alkane of the formula HO—A—OH wherein A has the abovedescribed significance with at least one hydrocarbylthionophosphine sulfide having a ratio of substituents of phosphorus to sulfur to hydrocarbyl radical R of approximately 1:2:1, the said hydrocarbyl radical R having the abovedescribed significance.

The hydrocarbylthionophosphine sulfide reactants of the method of this invention are in general high melting solids. They are characterized by a ratio of substituents of phosphorus to sulfur to hydrocarbyl radical R of approximately 1:2:1 and are usually represented by the broad formula $(R-PS_2)_n$ or, and preferably, by the formula

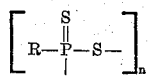

wherein $n$ is a whole number, usually less than 5, and wherein R has the aforedescribed significance, namely a hydrocarbyl radical free of aliphatic unsaturation (i.e. free of olefinic and/or acetylenic unsaturation), as for example the various alkyl, aryl, alkaryl, aralkyl, cycloalkyl, fused carbocyclic aromatic, partially and fully hydrogenated fused carbocyclic aromatic radicals, containing 1 to 18 carbon atoms, exemplary of which are methyl, ethyl, propyl, butyl, amyl, hexyl, heptyl, octyl, decyl, dodecyl, tetradecyl, octadecyl, cyclopentyl, cyclohexyl, cycloheptyl, methylcyclohexyl, cyclohexylmethyl, bicyclohexylyl, phenyl, tolyl, xylyl, cumyl, dodecylphenyl, cyclohexylphenyl, benzyl, phenethyl, phenpropyl, bibenzylyl, benzylphenyl, biphenylyl, naphthyl, tetrahydronaphthyl, anthracyl, phenanthryl, indanyl, indenyl, fluorenyl, etc., and the various isomeric forms thereof containing up to 18 carbon atoms. In general it is preferred that the "hydrocarbyl radical" be phenyl, $C_6H_5$, or an alkyl radical containing 1 to 4 carbon atoms and having at least one hydrogen substituent on the alpha carbon atom (i.e. the primary and secondary alkyl radicals as exemplified by methyl, ethyl, n-propyl, n-butyl, isopropyl, isobutyl, and sec. butyl).

These hydrocarbylthionophosphine sulfide reactants of the method of this invention are prepared by reacting hydrogen sulfide with a hydrocarbylthionophosphonic dichloride of the formula

wherein R has the aforedescribed significance. This reaction is accompanied by the evolution of hydrogen chloride and therefore the overall chemical equation can be set forth as

wherein $n$ is a whole number, usually less than 5, and wherein R has aforedescribed significance. The hydrocarbylthionophosphine sulfide product so produced is in many instances a mixture, the component parts of which are characterized by a ratio of substituents of phosphorus to sulfur to hydrocarbyl radical R of approximately 1:2:1 and which satisfy the formula

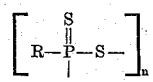

wherein R has the aforedescribed significance and wherein $n$ is a whole number, usually less than 5. Molecular weight determinations via standard ebullioscopic methods in carbon tetrachlorides indicate the hydrocarbylthionophosphine sulfide product is or is predominantly the dimeric form (i.e., $n=2$), the other forms when present usually being the trimeric (i.e., $n=3$) or the tetrameric (i.e., $n=4$) or higher polymeric forms. Each member of the mixture as well as the total mixture or any combination thereof function the same with respect to the alcohol reactant $(HO)_m R_1$ of the method of this invention.

As illustrative of the hydrocarbylthionophosphine sulfide reactants and their method of preparation is the following:

In each of the following Examples A, B, C, D, E, F, G and H the reaction vessel is a resin flask equipped with an agitator, thermometer, water-cooled reflux condenser or, and preferably for more economic use of hydrogen sulfide a Dry Ice-cooled reflux condenser, and a gas inlet tube. The gas inlet tube is connected in turn to a trap and flowmeter and thence to a hydrogen sulfide source. The outlet of the reflux condenser is connected to a safety trap and thence to a hydrogen halide scrubber. The issuing gas from the scrubber, is lead to the flame of a gas burner and the unreacted hydrogen sulfide burned.

EXAMPLE A

*Methylthionophosphine Sulfide*

To the aforedescribed reaction vessel is charged approximately 972 grams of methylthionophosphonic dichloride,

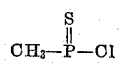

and the charge heated to the reflux temperature (about 160° C.). Hydrogen sulfide is then passed beneath the surface of the dichloride at varying rates in the range of 12 to 30 grams per hour until approximately 407 grams of hydrogen sulfide is added. During this addition the reaction temperature is maintained in the range of about 160 to 215° C. The reaction mass is cooled to room temperature, broken out of the reaction vessel, triturated under pentane, and dried in a vacuum dessicator. The yield of solid product is 98.6% of theory based on the dichloride charged. *Analysis.*—Theory 28.2% P, 58.4% S; Found 27.5% P, 58.4% S. The molecular weight of the solid product (an average of three ebullioscopic molecular weight determinations in carbon tetrachloride) is 226. Since 220 is the theoretical molecular weight of

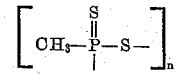

wherein $n$ is 2, the results indicate that the solid product is or is predominantly the dimeric compound (i.e. $n=2$).

EXAMPLE B

*Ethylthionophosphine Sulfide*

To the aforedescribed reaction vessel is charged approximately 100 grams of ethylthionophosphonic dichloride,

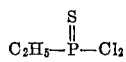

and the charge heated to approximately 175° C. Approximately 101 grams of hydrogen sulfide is then slowly passed beneath the surface of the dichloride over a period of about 11 hours. During this addition period the reaction temperature is maintained in the range of about 165 to about 220° C. The reaction mass is then cooled to room temperature, broken out of the reaction vessel, triturated under pentane, filtered and dried in a vacuum dessicator. The solid product (74.2 grams; 97.5% of theory yield based on dichloride charged) so obtained melts at 142–147° C. The molecular weight of the solid product (an average of three ebullioscopic molecular weight determinations in carbon tetrachloride over a wide range of concentrations to permit extrapolation to zero concentration) is 249. Theoretically the molecular weight of

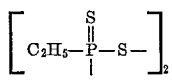

is 248 which indicates the solid product is or is predominantly the dimeric compound. Upon recrystallizing the solid product from chlorobenzene the melting point is 146–148° C.

*Analysis.*—Theory 25.0% P; Found 24.2% P.

EXAMPLE C

*Isopropylthionophosphine Sulfide*

To the aforedescribed reaction vessel is charged approximately 149 grams of isopropylthionophosphonic dichloride,

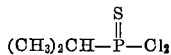

and the charge heated to approximately 170° C. Approximately 96 grams of hydrogen sulfide is passed beneath the surface of the dichloride at a rate of approximately 0.2 gram per minute. During this addition period the reaction temperature is maintained in the range of from about 170° C. to about 210° C. The reaction mass is then cooled to room temperature, broken out of the reaction vessel, washed with hexane and dried in a vacuum dessicator. The solid product (106 grams; 91.5% of theory yield based on dichloride charged) so obtained melts in the range of 160–175° C. The molecular weight of the solid product (an average of three ebullioscopic molecular weight determinations in carbon tetrachloride) is 298 which indicates it is composed largely of the dimeric compound, i.e.

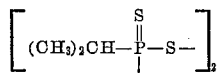

the residual components being higher polymeric forms of the dimeric compound. Upon recrystallizing the reaction product from chlorobenzene the melting point is 180–181.5° C.

*Analysis.*—Theory 22.4% P, 46.4% S; Found 21.8% P, 46.5% S.

EXAMPLE D

*n-Butylthionophosphine Sulfide*

To the aforedescribed reaction vessel is charged approximately 250 grams of n-butylthionophosphonic dichloride,

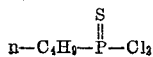

and the charge heated to approximately 170° C. Approximately 230 grams of hydrogen sulfide is then passed beneath the surface of the dichloride at a rate of approximately 0.2 gram per minute. During this addition the reaction temperature is maintained in the range of from about 170° C. The reaction mass is then cooled to room temperature, broken out of the reaction vessel, washed with hexane and dried in a vacuum dessicator. The yield is 181 grams (91% of theory based on the dichloride charged). The molecular weight of the solid product (an average of three ebullioscopic molecular weight determinations in carbon tetrachloride) is 314 which indicates the product is or predominantly is the dimeric compound

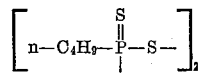

Upon recrystallizing the solid product from chlorobenzene gives a melting point of 105–110° C.

*Analysis.*—Theory 20.4% P; Found 20.2% P.

EXAMPLE E

*n-Propylthionophosphine Sulfide*

To the aforedescribed reaction vessel is charged approximately 87 grams of n-propylthionophosphonic dichloride,

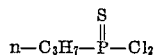

and the charge heated to approximately 170° C. Approximately 250 grams of hydrogen sulfide is then passed beneath the surface of the dichloride at a rate of about 0.2 gram per minute. During this addition the reaction temperature is maintained in the range of from about 170° C. to about 210° C. The reaction mass is then cooled to room temperature, broken out of the reaction vessel, washed with hexane and then dried in a vacuum dessicator. The solid product (68 grams; 79.5% of theory yield based on dichloride charged) so obtained melts in the range of 86–96° C. The molecular weight of the solid product (an average of three ebullioscopic molecular weight determinations in carbon tetrachloride) is 301 which indicates the product is largely the dimeric compound

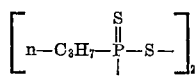

the residual components being higher polymeric forms thereof. Upon recrystallizing the solid product from chlorobenzene the melting point is 97–99° C.

*Analysis.*—Theory 22.5% P; Found 21.9% P.

EXAMPLE F

*Phenylthionophosphine Sulfide*

To the aforedescribed reaction vessel is charged approximately 100 grams of phenylthionophosphonic dichloride,

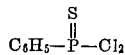

and the charge heated to approximately 235° C. Hydrogen sulfide is then passed beneath the surface of the dichloride at a rate of about 0.33 gram per minute until hydrogen chloride stops evolving. During this addition the reaction temperature is maintained in the range of from about 175 to about 235° C. The reaction mass is then cooled to room temperature and broken out of the reaction vessel, washed with hexane, and dried in a vacuum dessicator to give 70 grams of product which melts in the range of 215–232° C. The molecular weight of the solid product (an average of three ebullioscopic molecular weight determinations in carbon tetrachloride) is 342 which indicates the solid product is or is predominantly the dimeric compound

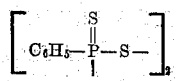

Upon recrystallizing the solid product from chlorobenzene the melting point is 233–243° C.

*Analysis.*—Theory 18.0% P, 37.2% S; Found 17.4% P, 36.62% S.

EXAMPLE G

Cyclohexylthionophosphine Sulfide

To the aforedescribed reaction vessel is charged approximately 49.8 grams of cyclohexylthionophosphonic dichloride,

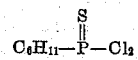

and the charge heated to approximately 200° C. Approximately 200 grams of hydrogen sulfide is then passed beneath the surface of the dichloride at a rate of about 0.2 gram per minute. During this addition the reaction temperature is maintained in the range of from 200 to 215° C. The reaction mass is then cooled to room temperature, broken out of the reaction vessel, triturated under hexane, and dried in a vacuum desiccator. The solid product (86% of theory based on dichloride charged) so obtained melts in the range of 138–155° C. The molecular weight of the solid product (an average of three ebullioscopic molecular weight determinations in carbon tetrachloride) is 419 which indicates that the solid product is a mixture of cyclohexylthionophosphine sulfides of the formula

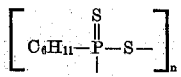

in which mixture the dimeric compound (i.e. $n=2$) predominates, the other component parts being higher polymeric forms thereof. Upon recrystallizing the solid product from chlorobenzene the melting point is 189–192° C.

*Analysis.*—Theory 17.5% P, 36.6% S; Found 17.2% P, 36.8% S.

In the preparation of several of the hydrocarbylthionophosphine sulfide reactants for the method of this invention it was found advantageous to include in the initial charge a small amount (e.g. up to about 15% by weight of the dihalide reactant charged) of the desired end product to hasten initial reaction and illustrative of such is the following:

EXAMPLE H

Methylthionophosphine Sulfide

To the aforedescribed reaction vessel is charged approximately 972 grams of methyl thiophosphonic dichloride,

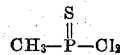

and approximately 100 grams of previously prepared methyl dithiophosphonic acid anhydride,

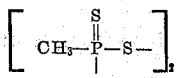

and the charge heated to 153° C. Hydrogen sulfide is then passed beneath the surface of the mass at a rate of about 0.2 gram per minute until hydrogen chloride stops evolving while maintaining the reaction mass at a temperature in the range of about 160 to 215° C. The reaction mass is then cooled to room temperature, broken out of the reaction vessel, triturated under pentane, and dried in a vacuum dessicator. The solid product (794 grams) melts in the range of 200–208° C. The molecular weight of the solid product (an average of three ebullioscopic molecular weight in carbon tetrachloride) is 235 which indicates the solid product is a mixture of materials satisfying the formula

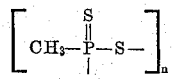

wherein $n$ averages approximately 2.15 and is composed chiefly of the dimeric compound

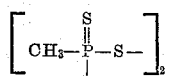

the residual components being higher polymeric forms thereof. The solid product after recrystallizing from chlorobenzene gives a melting point of 206–211° C. and analyzes as follows: Theory 28.2% P, 58.4% S; Found 27.9% P, 58.4% S.

In a similar manner employing the appropriate hydrocarbylthionophosphonic dichloride other hydrocarbylthionophosphine sulfides are prepared, e.g. 2-ethylhexyl thionophosphine sulfide, laurylthionophosphine sulfide, n-octadecylthionophosphine sulfide, cyclophentylthionophosphine sulfide, p-tolylthionophosphine sulfide, n-dodecylphenylthionophosphine sulfide, benzylthionophosphine sulfide, p-biphenylylthionophosphine sulfide, 2-naphthylthionophosphine sulfide, and the like, which are operable in preparing the aforedescribed esters of phosphonodithioic acids.

The hydrocarbyl thionophosphine sulfides of this invention react with the dihydric alkane reactant $$HO\!-\!A\!-\!OH$$

in accordance with the following chemical equation

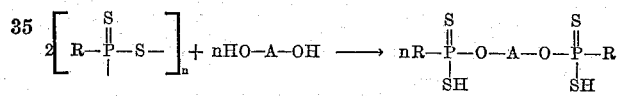

wherein $n$, R and A have the aforedescribed significance.

It is necessary in the method of this invention that the reaction system be fluid, i.e. maintained above the freezing point of the system. In that the reaction is exothermic in general it is not necessary to apply external heat at the beginning of the reaction, however, it is desirable when terminating the reaction to heat the reaction mass at a temperature in the range of from about 40° C. to about 90° C. In instances wherein the dihydric alkane reactant is a solid it is advantageous to conduct the reaction in the presence of an inert organic solvent (e.g. benzene, toluene, xylene, hexane, heptane, octane, ethylenedichloride, carbon tetrachloride, etc.). When the dihydric alkane reactant is a liquid and the economics permit it has been found desirable to conduct the reaction in the presence of an excess of the dihydric alkane reactant. For storage purposes it is convenient to convert the ester of phosphonodithioic acid to its ammonium salt by sparging an inert organic solvent solution thereof with anhydrous ammonia.

The dihydric alkane reactants of the method of this invention include a large variety of glycols which satisfy the formula HO—A—OH wherein A is divalent aliphatic hydrocarbon radical of the empirical formula $C_mH_{2m}$ wherein $m$ is a whole number from 2 to 6, the said A having a chain length of at least two carbon atoms between the respective —OH groups, the respective carbon atoms to which the respective —OH groups are attached having at least one hydrogen substituent attached thereto (i.e., be primary carbon —CH$_2$— or secondary carbons >CH—). As illustrative of these reactants are ethylene glycol, propylene glycol, trimethylene glycol, tetramethylene glycol, pentamethylene glycol, hexamethylene glycol, 1,2-dihydroxy-n-butane, 1,3-dihydroxy-n-butane, 2,4-dihydroxy-n-pentane, 2,2-dimethyl-1,3-dihydroxypropane, 1,5-dihydroxy-n-hexane, and the various isomeric forms which satisfy the foregoing formula HO—A—OH. The preferred dihydroxy alkanes are those of the foregoing formula wherein A is a polymethylene radical of the empirical formula $(CH_2)_d$ wherein $d$ is a whole number from 2 to 6, as for example ethylene glycol, trimethylene glycol, tetramethylene glycol, pentamethylene glycol, and hexamethylene glycol, of which the preferred is ethylene glycol.

As illustrative of the process of this invention but not limitative thereof is the following:

EXAMPLE I

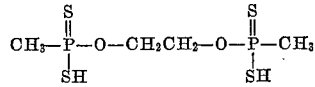

To a suitable reaction vessel equipped with an agitator, thermometer, reflux condenser and dropping funnel is charged 44.0 parts by weight of methylthionophosphine sulfide (the product of Example H) and 78 parts by weight. While agitating the contents of the reaction vessel 12.4 parts by weight of ethylene glycol is added dropwise from the dropping funnel. During this addition the temperature rose to about 50° C. The mass is then heated at 50–60° C. for about forty minutes. The reaction mass is then subjected to vacuum distillation at about 60° C. to remove the volatiles. The residue, 56.4 parts by weight of an amber oil, is O,O-(1,2-ethylene) bis(methylphosphonodithioic acid).

In a suitable reaction vessel is charged 14.6 parts by weight of O,O-(1,2-ethylene) bis(methylphosphonodithioic acid) and 100 parts by weight of benzene. While agitating this solution at about 25–45° C. anhydrous ammonia is added via a gas sparge. The resulting slurry is cooled to room temperature, filtered and the filter cake washed with benzene. The filter cake is then vacuum dried to give 16 parts by weight of O,O-(1,2-ethylene) bis(ammonium methylphosphonodithioate).

*Analysis.*—Theory 8.85% N, 40.5% S; Found 8.98% N, 39.5% S.

EXAMPLE II

Employing the procedure of Example I but replacing methylthionophosphine sulfide with an equimolecular amount of ethylthionophosphine sulfide (the product of Example B) there is obtained O,O-(1,2-ethylene) bis-(ethylphosphonodithioic acid).

EXAMPLE III

Employing the procedure of Example I but replacing methylthionophosphine sulfide with an equimolecular amount of phenylthionophosphine sulfide (the product of Example F) there is obtained O,O-(1,2-ethylene) bis-(phenylphosphonodithioic acid).

EXAMPLE IV

Employing the procedure of Example I but replacing ethylene glycol with an equimolecular amount of propylene glycol there is obtained O,O-(1,2-propylene) bis(methylphosphonodithioic acid).

EXAMPLE V

Employing the procedure of Example I but replacing ethylene glycol with an equimolecular amount of tetramethylene glycol there is obtained O,O-(1,4-butylene) bis(methylphosphonodithioic acid).

EXAMPLE VI

Employing the procedure of Example I but replacing ethylene glycol with an equimolecular amount of hexamethylene glycol there is obtained O,O-(1,6-hexylene) bis(methylphosphonodithioic acid).

EXAMPLE VII

Employing the procedure of Example 1 but replacing methylthionophosphine sulfide with an equimolecular amount of n-propylthionophosphine sulfide (the product of Example E) there is obtained O,O-(1,2-ethylene) bis(n-propylphosphonodithioic acid).

EXAMPLE VIII

Employing the procedure of Example I but replacing methylthionophosphine sulfide with an equimolecular amount of n-butylthionophosphine sulfide (the product of Example D) there is obtained O,O-(1,2-ethylene) bis(n-butylphosphonodithioic acid).

EXAMPLE IX

Employing the procedure of Example I but replacing methylthionophosphine sulfide with an equimolecular amount of cyclohexylthionophosphine sulfide (the product of Example G) there is obtained O,O-(1,2-ethylene) bis(cyclohexylphosphonodithioic acid).

EXAMPLE X

Employing the procedure of Example I but replacing ethylene glycol with an equimolecular amount of 2,2-dimethyl-1,3-dihydroxypropane there is obtained O,O-(2,2-dimethyl-1,3-propylene) bis(methylphosphonodithioic acid).

EXAMPLE XI

Employing the procedure of Example I but replacing ethylene glycol with an equimolecular amount of 2,4-dihydroxy-n-pentane there is obtained O,O-(2,4-n-pentylene) bis(methylphosphonodithioic acid).

Other esters of phosphonodithioic acids prepared in accordance with the process of this invention from the appropriate dihydroxy alkane and the appropriate hydrocarbylthionophosphine sulfide include O,O-(1,2-propylene) bis (n-propylphosphonodithioic acid)
O,O-(1,2-ethylene) bis(isoamylphosphonodithioic acid)
O,O-(1,2-ethylene) bis[(2-ethylhexyl)phosphonodithioic acid]
O,O-(1,4-butylene) bis(laurylphosphonodithioic acid)
O,O-(1,2-ethylene) bis(n-octadecylphosphonodithioic acid)
O,O-(1,2-ethylene) bis(laurylphosphonodithioic acid)
O,O-(1,6-hexylene) bis n-amylphosphonodithioic acid)
O,O-(1,2-ethylene) bis(benzylphosphonodithioic acid)
O,O-(1,2-propylene) bis[(β-phenethyl)phosphonodithioic acid]
O,O-(1,2-butylene) bis(cyclopentylphosphonodithioic acid)
O,O-(1,5-pentylene) bis[(2-naphthyl)phosphonodithioic acid]
O,O-(1,2-ethylene) bis(tetrahydronaphthylphosphonodithioic acid)
O,O-(1,2-ethylene) bis[(4-biphenylyl)phosphonodithioic acid]
O,O-(1,2-ethylene) bis(terphenylylphosphonodithioic acid)
O,O-(1,2-ethylene) bis(indanylphosphonodithioic acid)
O,O-(1,2-ethylene) bis(phenanthrylphosphonodithioic acid)
O,O-(1,4-butylene) bis(phenylphosphonodithioic acid)
O,O-(1,6-hexylene) bis(phenylphosphonodithioic acid)
O,O-(1,3-propylene) bis [(4-ethylphenyl)phosphonodithioic acid]
O,O-(1,2-ethylene) bis(n-dodecylphenylphosphonodithioic acid)
O,O-(1,2-ethylene) bis(3,5-xylylphosphonodithioic acid)
O,O-(1,2-n-pentylene) bis(laurylphosphonodithioic acid)
O,O-(1,3-n-pentylene) bis(n-octadecylphosphonodithioic acid)
O,O-(1,2-n-hexylene) bis[(4-biphenylyl)phosphonodithioic acid]
O,O-(1,2-n-hexylene) bis[(2-naphthyl)phosphonodithioic acid] and the like.

The esters of phosphonothioic acids described herein before are toxic to a wide variety of insects. They are also useful as intermediates for the preparation of a wide variety of insecticidal phosphonodithioates. For example (1) The addition of acrylonitrile to the free acid provides esters of the formula

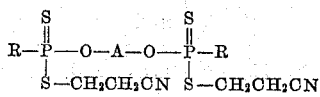

exemplary of which is O,O-(1,2-ethylene)-bis[S-(2-cyanoethyl) methylphosphonodithioate] an amber oil which is effectively toxic to plum curculio, *Conotrachelus nenuphar*;

(2) The reaction of a lower alkyl chloride with the ammonium salt of an ester of phosphonodithioic acid of this invention provides esters of the formula

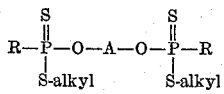

exemplary of which is O,O-(1,2-ethylene) bis(S-ethyl methylphosphonodithioate) an amber oil which exhibited 100% kill of mosquito larvae, *Aedes aegypti*, at a concentration of 1 part per million.

While this invention has been described with respect to certain illustrative embodiments it is to be understood that it is not so limited and that variations and modifications thereof obvious to those skilled in the art can be made without departing from the spirit or scope of this invention.

What is claimed is:

1. The method of making an ester of a phosphonothioic acid of the formula

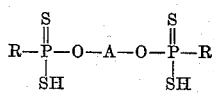

wherein R is a hydrocarbyl radical selected from the group consisting of alkyl, aryl, alkaryl, aralkyl, cycloalkyl, fused carbocyclic aromatic, partially hydrogenated fused carbocyclic aromatic and fully hydrogenated fused carbocyclic aromatic radicals and wherein A is a divalent aliphatic hydrocarbon radical of the empirical formula $C_mH_{2m}$ wherein $m$ is a whole number from 2 to 6, the said A having a chain length of at least two carbon atoms connecting the respective oxygen atoms of the afore set forth structural formula, the respective carbon atoms of said A attached to the said oxygen atoms respectively containing at least one hydrogen substituent, which comprises reacting at least one dihydric alkane of the formula HO—A—OH wherein A has the aforedescribed significance with at least one hydrocarbylthionophosphine sulfide having a ratio of substituents of phosphorus to sulfur to hydrocarbyl radical R of approximately 1:2:1, the said hydrocarbyl radical R having the aforedescribed significance.

2. The method of making an ester of a phosphonodithioic acid of the formula

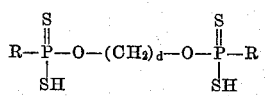

wherein R is a hydrocarbyl radical selected from the group consisting of alkyl, aryl, alkaryl, aralkyl, cycloalkyl, fused carbocyclic aromatic, partially hydrogenated fused carbocyclic aromatic and fully hydrogenated fused carbocyclic aromatic radicals and wherein $d$ is a whole number from 2 to 6, which comprises reacting at least one dihydric alkane of the formula HO—(CH$_2$)$_d$—OH wherein $d$ is a whole number from 2 to 6 with a hydrocarbylthionophosphine sulfide of the formula

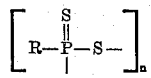

wherein R has the aforedescribed significance and wherein $n$ is a whole number.

3. The method of making an alkylphosphonodithioic acid of the formula

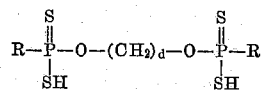

wherein R is an alkyl radical containing 1 to 4 carbon atoms the alpha-carbon atom of which contains at least one hydrogen substituent, and wherein $d$ is a whole number from 2 to 6, which comprises reacting at least one dihydric alkane of the formula HO—(CH$_2$)$_d$—OH wherein $d$ has the aforedescribed significance with an alkyl thionophosphine sulfide of the formula

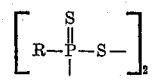

wherein R has the aforedescribed significance.

4. The method of making a phenylphosphonodithioic acid of the formula

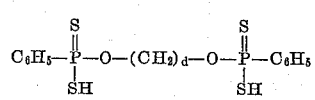

wherein $d$ is a whole number from 2 to 6 which comprises reacting at least one dihydric alkane of the formula HO—(CH$_2$)$_d$—OH wherein $d$ has the aforedescribed significance with a phenylthionophosphine sulfide of the formula

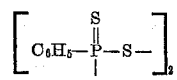

5. The process of claim 3 wherein R is methyl.
6. The process of claim 3 wherein R is ethyl.
7. The process of claim 4 wherein $d$ is 2.
8. The process of claim 3 wherein R is methyl and wherein $d$ is 2.
9. The process of claim 3 wherein R is ethyl and wherein $d$ is 2.
10. An ester of a phosphonodithioic acid of the formula

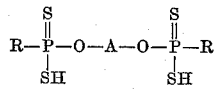

wherein R is a hydrocarbyl radical selected from the group consisting of alkyl, aryl, alkaryl, aralkyl, cycloalkyl, fused carbocyclic aromatic, partially hydrogenated fused carbocyclic aromatic and fully hydrogenated fused carbocyclic aromatic radicals and wherein A is a divalent aliphatic hydrocarbon of the empirical formula $C_mH_{2m}$ wherein $m$ is a whole number from 2 to 6, the said A having a chain length of at least two carbon atoms connecting the respective oxygen atoms of the afore set forth structural formula, the respective carbon atoms of said A attached to the said oxygen atoms respectively containing at least hydrogen substituent.

11. An ester of claim 10 wherein A is of the empirical formula (CH$_2$)$_d$ wherein $d$ is a whole number from 2 to 6.

12. An ester of an alkyl phosphonodithioic acid of the formula

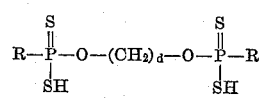

wherein R is an alkyl radical containing 1 to 4 carbon atoms the alpha carbon atom of which contains at least one hydrogen substituent and wherein $d$ is a whole number from 2 to 6.

13. An ester of claim 12 wherein R is methyl.
14. 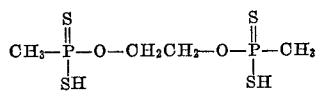
15. An ester of a phenylphosphonodithioic acid of the formula
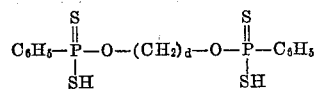
wherein $d$ is a whole number from 2 to 6.
16. 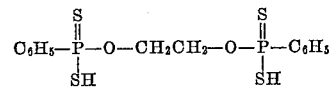
No references cited.